United States Patent
Gundavelli et al.

(10) Patent No.: US 10,880,748 B1
(45) Date of Patent: Dec. 29, 2020

(54) OPEN ACCESS IN NEUTRAL HOST NETWORK ENVIRONMENTS

(71) Applicant: Cisco Technology, Inc., San Jose, CA (US)

(72) Inventors: Srinath Gundavelli, San Jose, CA (US); Vimal Srivastava, Bangalore (IN); Mark Grayson, Berkshire (GB); Sudhir Kumar Jain, Fremont, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/675,902

(22) Filed: Nov. 6, 2019

(51) Int. Cl.
*H04M 3/16* (2006.01)
*H04W 12/08* (2009.01)
(Continued)

(52) U.S. Cl.
CPC ......... *H04W 12/0804* (2019.01); *H04W 8/02* (2013.01); *H04W 8/18* (2013.01);
(Continued)

(58) Field of Classification Search
CPC .. H04W 12/08; H04W 12/0602; H04W 76/10
See application file for complete search history.

(56) References Cited

U.S. PATENT DOCUMENTS

2017/0311243 A1* 10/2017 Rinne .................. H04W 48/18
2018/0041404 A1 2/2018 Singh et al.
(Continued)

FOREIGN PATENT DOCUMENTS

EP 3048832 A1 7/2016

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 15)", 3GPP TS 36.300 V15.6.0 (Jun. 2019), p. 1-73.
(Continued)

*Primary Examiner* — Shantell L Heiber
(74) *Attorney, Agent, or Firm* — Edell, Shapiro & Finnan, LLC

(57) ABSTRACT

Techniques are described to provide open access in a neutral host environment. In one example, a method includes obtaining, by a mobility management node of a neutral host network, a network connectivity request from a user equipment, wherein the network connectivity request comprises an indication of a preferred service provider to which the user equipment is to be connected; determining, by the mobility management node, that the preferred service provider provides non-subscription-based network connectivity for the neutral host network; based on determining that the preferred service provider provides non-subscription-based network connectivity for the neutral host network, establishing secure communications for the user equipment, wherein the secure communications are established for the user equipment without authenticating an identity of user equipment; and providing network connectivity between the user equipment and the preferred service provider upon establishing the secure communications.

20 Claims, 8 Drawing Sheets

(51) Int. Cl.
　　　*H04W 76/10*　　　(2018.01)
　　　*H04W 12/00*　　　(2009.01)
　　　*H04W 8/02*　　　(2009.01)
　　　*H04W 48/10*　　　(2009.01)
　　　*H04W 48/18*　　　(2009.01)
　　　*H04W 8/18*　　　(2009.01)

(52) U.S. Cl.
　　　CPC ..... *H04W 12/001* (2019.01); *H04W 12/0051* (2019.01); *H04W 48/10* (2013.01); *H04W 48/18* (2013.01); *H04W 76/10* (2018.02)

(56) References Cited

U.S. PATENT DOCUMENTS

| 2018/0199384 | A1* | 7/2018 | Mizikovsky | H04W 76/38 |
| 2019/0058508 | A1* | 2/2019 | Yiu | H04B 17/336 |
| 2019/0159268 | A1* | 5/2019 | Nilsson | H04W 12/06 |
| 2019/0174314 | A1* | 6/2019 | Joseph | H04W 12/004 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 15)", 3GPP TS 36.300 V15.6.0 (Jun. 2019), p. 74-147.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 15)", 3GPP TS 36.300 V15.6.0 (Jun. 2019), p. 148-219.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 15)", 3GPP TS 36.300 V15.6.0 (Jun. 2019), p. 220-293.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 15)", 3GPP TS 36.300 V15.6.0 (Jun. 2019), p. 294-365.

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1 (Jun. 2019), pp. 1-200 pages.

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1 (Jun. 2019), pp. 201-400.

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1 (Jun. 2019), pp. 401-549.

3GPP, "3rd Generation Partnership Project; Technical Specification Group Services and System Aspects; Study on system enhancements for provision of access to restricted local operator services by an unauthenticated User Equipment (UE) (Release 16)", 3GPP TR 23.715 V16.0.0 (Sep. 2018), 38 pages.

D. Harkins, Ed. et al., "Opportunistic Wireless Encryption", Internet Engineering Task Force (IETF), ISSN: 2070-1721, Mar. 2017, 12 pages.

Kasme, "Key Access Security Management Entries", 3 pages, downloaded from Internet Aug. 27, 2019; https://www.mpirical.com/glossary/kasme-key-access-security-management-entries.

CBRS Alliance, "CBRS Network Services Stage 2 and 3 Specification", CBRSA-TS-1002, V2.0.0, Feb. 4, 2019, 52 pages.

CBRS Alliance, "CBRS Network Services Technical Specification", CBRSA-TS-1001, V1.0.0, Feb. 1, 2018, 19 pages.

The Wireless Innovation Forum, "Acronyms and Definitions Pertaining to Commercial Operations in the U.S. 3550-3700 MHz Band", 7 pages, downloaded from Internet May 11, 2019; https://www.wirelessinnovation.org/fcc-definitions.

CBRS Alliance, "CBRS Alliance Identifier Administration Guidelines for Shared HNI", CBRSA-TS-0101, V1.0.0, Jan. 21, 2019, 12 pages.

CBRS Alliance, "CBRS Network Service Technical Specifications", CBRSA-TS-1002, V1.0.0, Feb. 1, 2018, 26 pages.

3GPP, 3rd Generation Partnership Project; Technical Specification Group Radio Access Network; Evolved Universal Terrestrial Radio Access Network (E-UTRAN); S1 Application Protocol (S1AP) (Release 15), 3GPP TS 36.413 V15.6.0 (Jul. 2019), pp. 1-194.

3GPP, 3rd Generation Partnership Project; Technical Specification Group Radio Access Network; Evolved Universal Terrestrial Radio Access Network (E-UTRAN); S1 Application Protocol (S1AP) (Release 15), 3GPP TS 36.413 V15.6.0 (Jul. 2019), pp. 195-388.

\* cited by examiner

OPEN ACCESS IN NEUTRAL HOST NETWORK ENVIRONMENTS

TECHNICAL FIELD

The present disclosure relates to network equipment and services.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges in managing network access in neutral host environments.

DESCRIPTION OF EXAMPLE EMBODIMENTS

Overview

Figure 1:
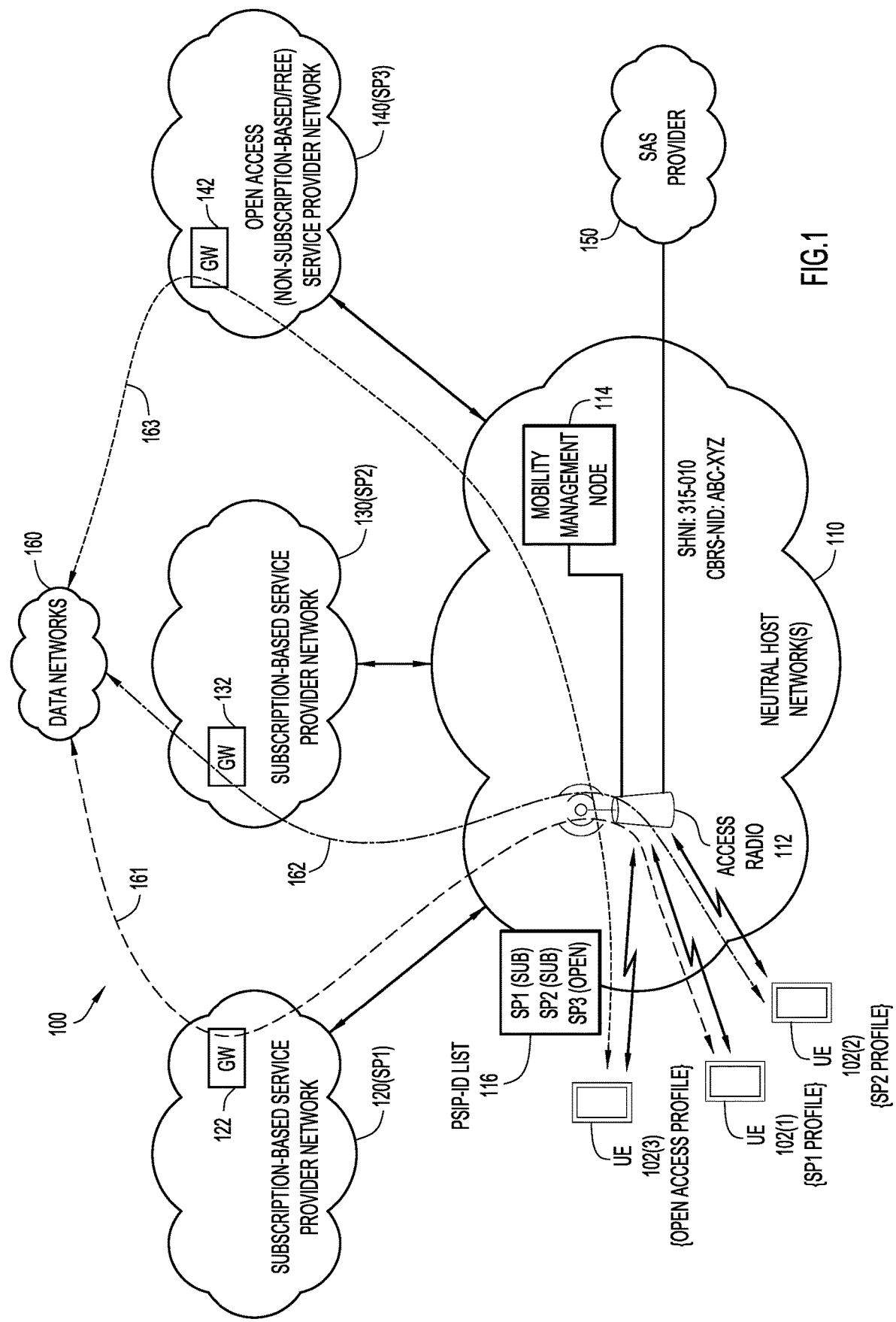
FIG. 1 is a block diagram of a system in which techniques for providing open access in a neutral host environment may be implemented, according to an example embodiment.

Techniques presented herein provide the ability for a device to select an open access (e.g., non-subscription-based) network in the presence of multiple service networks provided by different service providers within a neutral host network based on an explicit handshake between a user equipment and the network. In various implementations, techniques presented herein may be utilized to provide open access support for various accesses/spectrum allocations including, but not limited to, Citizens Broadband Radio Service (CBRS) accesses, non-CBRS accesses, private cellular accesses (e.g., 4G, 5G, etc.), combinations thereof, and/or the like now known or hereafter developed.

In an example embodiment, a method is provided that includes obtaining, by a mobility management node of a neutral host network, a network connectivity request from a user equipment, wherein the network connectivity request comprises an indication of a preferred service provider to which the user equipment is to be connected; determining, by the mobility management node, that the preferred service provider provides non-subscription-based network connectivity for the neutral host network; based on determining that the preferred service provider provides non-subscription-based network connectivity for the neutral host network, establishing secure communications for the user equipment, wherein the secure communications are established for the user equipment without authenticating an identity of user equipment; and providing network connectivity between the user equipment and the preferred service provider upon establishing the secure communications.

In another example embodiment, another method is provided that includes receiving, by a user equipment, a broadcast from an access radio of a neutral host network; identifying a participating service provider (PSP) list included in the broadcast, wherein the PSP list includes an identifier for each of a plurality of service providers that provide network connectivity for the neutral host network; identifying a service attribute included in the broadcast for each service provider identified in the PSP list; determining, based, at least in part, on the PSP list and the service attribute for each service provider, a preferred service provider to provide network connectivity for the user equipment in which the preferred service provider provides non-subscription-based network connectivity for the neutral host network; and transmitting a network connectivity request to the neutral host network, wherein the network connectivity request comprises an indication of the preferred service provider.

EXAMPLE EMBODIMENTS

One of the key aspects of Federal Communication Commission (FCC) rules governing Citizens Broadband Radio Service (CBRS) spectrum usage provides for the enablement of new business models around neutral host networks (NHNs). In large, public venues such as in airports, coffee shops, stadiums, university campuses, etc. neutral host providers (e.g., service providers) can manage a CBRS network with Spectrum Access System (SAS) coordination for meeting regulatory requirements. These providers will allow other entities to use the network under some monetary terms for offering network services to their customers. Traditional Mobile Network Operators (MNOs) may be able to integrate their core network with a CBRS network using standard Third Generation Partnership Project (3GPP)/CBRS Alliance defined interfaces so that these venues can be accessible to subscribers of MNOs, as any other visitor network. Service providers providing network access/connectivity within a neutral host environment are typically referred to as Participating Service Providers (PSPs)

The MNO profile on a user equipment (UE), typically configured on a traditional Subscriber Identity Module (SIM) or in an embedded Universal Integrated Circuit Card (eUICC), is sufficient for the UE to discover an operator's network with whom they have the subscription. Various elements in the profile such as operator identifier, subscriber identifier, and the authentication credentials are sufficient for a successful attachment in conventional deployments. However, in the same venue as an operator's service network and using the resources from the same neutral host network, there may also be other smaller business entities, such as coffee shops, restaurants, stores, etc. offering free CBRS network access/connectivity to any visitor of such entities.

There is an implicit assumption in CBRS specifications that a UE will have a pre-configured profile, either in the form of an operator's hardware SIM or a profile created dynamically using the Global System for Mobile Communications (GSMA) eUICC Remote SIM Provisioning interface, which typically involves bootstrapping the UE profile with some shared credentials for use with provisioning entities in a network. Such assumptions for facilitating on-boarding based on a pre-configured operator profile may be valid for MNOs with established business relationship with their customer and/or with enterprise users. However, such assumptions are not valid for entities offering free access to customers with whom they have no pre-existing business relationship. In such instances, it may not be possible for such an entity to provision a profile on the UE 'on-the-fly', as the UE does not share any credentials with the entity's service network. It may also not be possible for the UE to auto-discover a free network and provision the required credentials to access the network instantly.

The Attach procedure as prescribed by 3GPP Specifications allows a UE to look for a network based on the profiles present in the eUICC but does not provide for the ability to discover any 'free' network (e.g., non-subscription-based network) and latch on to it. Therefore, attachment to an open access network, either automatically, or based on a simple touch is not currently possible for accesses such as CBRS.

Presented herein are techniques to provide the ability for a device (e.g., a UE) to select a non-subscription-based open access network for network connectivity in the presence of multiple service networks provided by different service providers within a neutral host network based on an explicit handshake between the device and the neutral host network. At least one purpose and goal of techniques presented herein may be to bring open access support to CBRS radio access/networks, private 3GPP cellular access/networks (e.g., private Long Term Evolution (LTE) access/networks, private 5G, etc.), combinations thereof, and/or the like now known or hereafter developed.

FIG. 1 is a block diagram of a system 100 in which techniques for providing open access in a neutral host environment may be implemented, according to an example embodiment. In at least one implementation, system 100 may include one or more neutral host network(s) 110, a first service provider (SP) network 120, a second SP network 130, a third SP network 140, a Spectrum Access System (SAS) provider 150, and one or more data network(s) 160. Also shown in FIG. 1 are a number of user equipment (UEs) 102(1), 102(2), and 102(3).

The one or more neutral host network(s) 110 may be referred to herein more generally as a neutral host network (NHN) 110, which may include at least one access radio 112 and a mobility management node 114. SAS provider 150 may interface with access radio 112. Mobility management node 114 and access radio 112 may also interface with each other. Access radio 112 may be configured with appropriate hardware (e.g., receivers, transmitters, antennas, baseband processors (modems), etc.), software, combinations thereof, and/or the like to facilitate over-the-air Radio Frequency (RF) communications with UEs 102(1)-102(3), which may include similar hardware, software, combinations thereof, and/or the like to facilitate over-the-air RF communications with access radio 112.

A first service provider (SP1) may operate the first SP network 120 (also referred to herein as 'SP1 network 120'), which may include at least one gateway 122 to facilitate network connectivity and services between NHN 110 and one or more data network(s) 160. A second service provider (SP2) may operate the second SP network 130 (also referred to herein as 'SP2 network 130'), which may include at least one gateway 132 to facilitate network connectivity and services between NHN 110 and one or more data network(s) 160. A third service provider (SP3) may operate the third SP network 140 (also referred to herein as 'SP3 network 140'), which may include at least one gateway 142 to facilitate network connectivity and services between NHN 110 and one or more data network(s) 160.

In various embodiments, data network(s) 160 may be any combination of the Internet, an Internet Protocol (IP) Multimedia Subsystem (IMS), enterprise network, and/or the like. In other embodiments, data network(s) 160 may be any combination of Ethernet and/or Ethernet switching systems, and/or the like. In various embodiments, GWs 122, 132, and 142 may be any combination of Serving Gateways (SGWs), Packet Data Network (PDN) Gateways (PGWs), combined Service/PDN Gateways (S/PGWs), such as System Architecture Evolution Gateways (SAEGWs), user-plane/control-plane SGWs (for control and user plane separation architectures), user-plane/control-plane PGWs, combined user-plane/control-plane SGWs/PGWs, Session Management Functions (SMFs), User Plane Functions (UPFs), and/or the like that may be known here and/or hereinafter developed.

For example embodiments discussed herein, consider that each respective service provider, SP1 and SP2, are respective subscription-based service providers offering subscription-based access to network connectivity/services for user equipment within system 100 via respective SP1 network 120 and SP2 network 130, while SP3 is a non-subscription-based service provider offering non-subscription-based or 'open' access to network connectivity/services for user equipment within system 100 via SP3 network 140. Accordingly, as referred to herein, the terms 'non-subscription-based' and 'open access' may be used interchangeably to refer to a network and/or services that may be provided by a service provider with no monetary cost (e.g., 'free') for access usage of the service provider's network. Such a network may also be characterized as supporting an 'OPEN-ACCESS' mode for network connectivity/services. For example, SP3 network 140 for the embodiment of FIG. 1 may be considered an open access network (e.g., non-subscription-based/free). In some embodiments, SP1 and SP2 may be associated with MNOs such as AT&T®, Verizon®, etc. offering respective subscription-based networks (e.g., having a monetary cost/not free), while SP3 may be associated with a business, store, entity, or the like (e.g., Starbucks®) offering a non-subscription-based (e.g., not having a monetary cost/free) open access network.

A neutral host provider may operate NHN 110 to facilitate shared radio access in the neutral host environment illustrated for the embodiment of FIG. 1. Generally, a neutral host provider may be considered a service provider that operates/offers wireless services to customers via access radios (e.g., access radio 112) within a NHN (e.g., NHN 110) and/or shares the network with other service providers. The SAS provider 150 may provide for enforcing spectrum regulation rules (e.g., CBRS spectrum regulation) for access radios in a network such as ensuring that there is an explicit grant of spectrum resources for a given access radio in a given location, instructing an access radio to vacate a band, protecting incumbent owners of the spectrum from new allocations, etc.

Consider for example embodiments discussed herein that NHN 110 is configured as a private CBRS access network having a Shared Home Network Identifier (SHNI) set to '315-010' (SHNI: 315-010), which is the Public Land Mobile Network (PLMN) identifier (PLMN-ID) as recommended by the CBRS Alliance. By 'private' it is meant that the NHN 110 is a network that provides network connectivity/services to clients (e.g., devices, users, etc.) served by a network operator and/or service provider of the network, such as the neutral host provider. In one example, a private network may be considered to be a network that may be implemented to serve enterprise purposes (e.g., business purposes, government purposes, educational purposes, etc.) for enterprise clients in which the private network may be operated by any combination of traditional mobile network operators/service providers (e.g., AT&T®, Verizon®, etc.), enterprises network operators/service providers (e.g., Cisco®, etc.), and/or third party network operators/service providers (e.g., neutral host network operators/service providers, cloud service providers, etc.).

Further consider that NHN 110 may be configured with a CBRS Network Identifier (CBRS-NID) set to 'ABC-XYZ' (CBRS-NID: ABC-XYZ), which can, in various embodiments, be set to any value as directed by the neutral host provider or the CBRS Alliance. Although examples provided herein are discussed with reference to SHNI '315-010', this SHNI is only provided for example purposes only and is not meant to limit the broad scope of the present disclosure. Any other SHNI that may be allocated by the CBRS Alliance and/or any other entity can be utilized equally within a CBRS deployment in accordance with techniques described herein.

To facilitate providing open access to the private radio service (e.g., provided via access radio 112) in the neutral host environment of system 100, a UE, such as UE 102(3) can be configured with a special wild card access profile. Unlike, a standard MNO access profile, the wild card network profile does not identify a specific MNO, or any specific entity, but rather identifies a 'Type' of network to which a UE would prefer to attach. The 'Type' in this context is an open access network that requires no subscription and has no monetary cost for access usage.

In at least one embodiment, parameters included in a wild card access profile may include an SHNI matching the PLMN-ID allocated by the CBRS Alliance (e.g., '315-010'), a CBRS-NID or 'CSGAllowedList' indicating that the UE can attach to any NID (e.g., CBRS-NID='ANY', '*', or any similar indication that may be used to indicate a wild card), and a service attribute indicating that the UE prefers to attach to a service provider's network that supports an open access mode (e.g., Service-Attribute=OPEN-ACCESS). Such a wild card access profile may allow a UE in a neutral host environment to look for networks that advertise open access capability. In some embodiments, a wild card access profile may optionally include a list of allowed SPs, also referred to herein as participating service providers (PSPs), offering open access to which a UE may prefer to connect. In still some embodiments, an optional list of allowed PSPs, may be provided in ranked order, indicating an order of preference for selecting an open access network (e.g., (1)$SP_X$(OPEN), (2)$SP_Y$(OPEN), (3)$SP_Z$(OPEN) in which $SP_X$>$SP_Y$>$SP_Z$ in terms of selection rank). Other variations can be envisioned.

Additionally, access radio 112 in the NHN 110 can be configured as a Hybrid Closed Subscriber Group (CSG) cell that is enabled for open-access-connectivity such that both whitelisted users and non-whitelisted users may connect to access radio 112. Network broadcasts provided by the access radio, as part of advertising a list PSPs providing service in that cell (referred to herein as a PSP-ID list), can include additional metadata that indicates which of the PSP networks support the OPEN-ACCESS mode. This allows a UE to attach to an open access network matching the service attribute OPEN-ACCESS as set in the UE's wild card access profile.

Consider, for example, that access radio 112 broadcasts a PSP-ID list 116 as shown in FIG. 1 that includes a service attribute indication of 'OPEN' to indicate that an SP provides an OPEN-ACCESS mode (e.g., non-subscription-based/free) network or 'SUB' to indicate that an SP provides a subscription-based network. For example, SP1 and SP2 can be advertised as providing subscription-based networks, while SP3 can be advertised as providing an open access or non-subscription-based network.

As shown in FIG. 1, consider that UE 102(1) may be configured with a access profile associated with SP1 to allow UE 102(1) to latch on or connect to SP1 network 120 for network connectivity/services with data network(s) 160 (as illustrated by dashed-line 161), UE 102(2) may be configured with a access profile associated with SP2 to allow UE 102(2) to latch on or connect to SP2 network 130 for network connectivity/services with data network(s) 160 (as illustrated by dashed-line 162), and UE 102(3) may be configured with a wild card or open access profile to allow UE 102(3) to latch on or connect to SP3 network 140 for network connectivity/services with data network(s) 160 (as shown by dashed-line 163) or any other network that supports Open access.

Figure 2A:
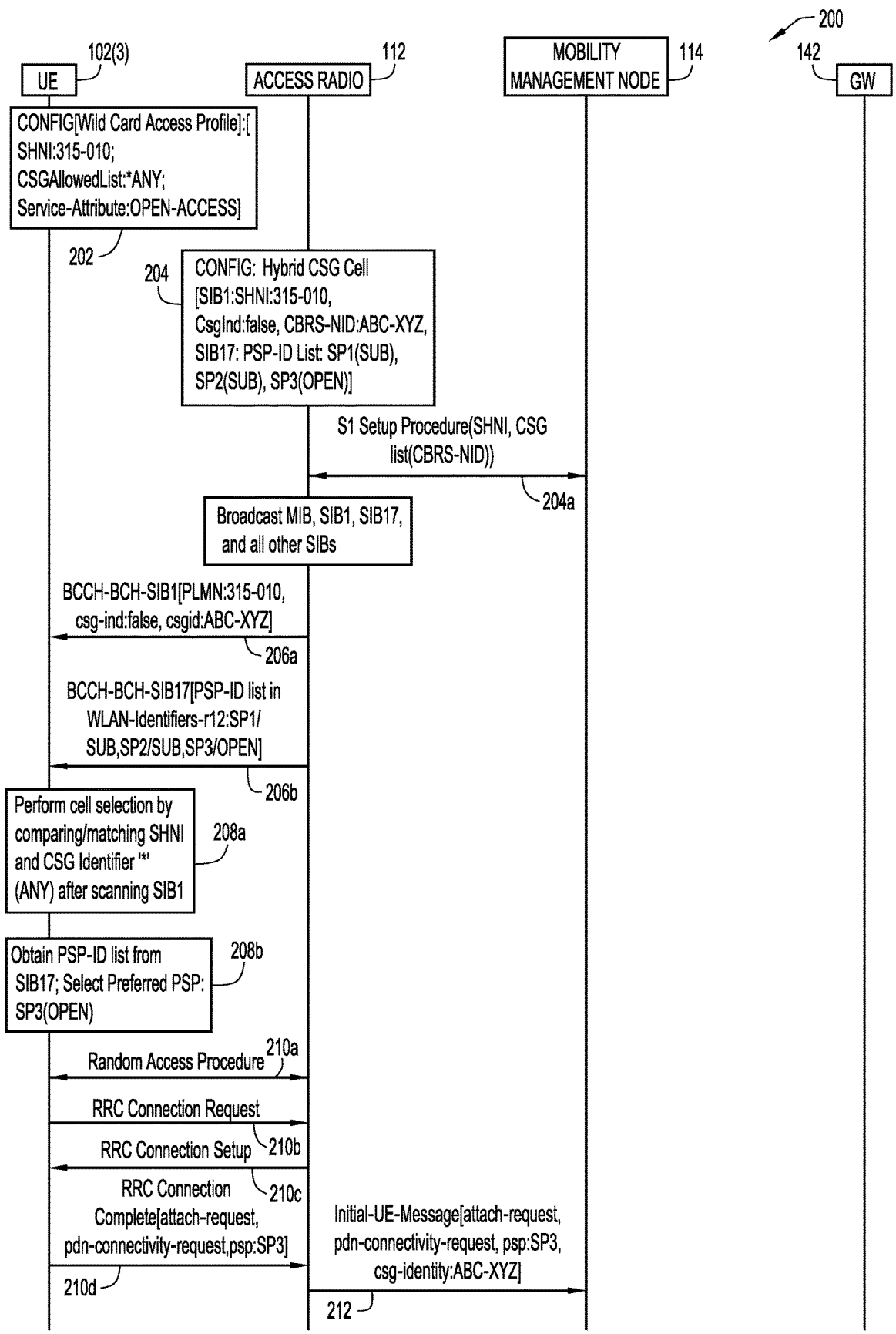
FIGS. 2A and 2B are a message sequence diagram illustrating a call flow for providing open access in the neutral host environment of FIG. 1, according to an example embodiment.
Figure 2B:
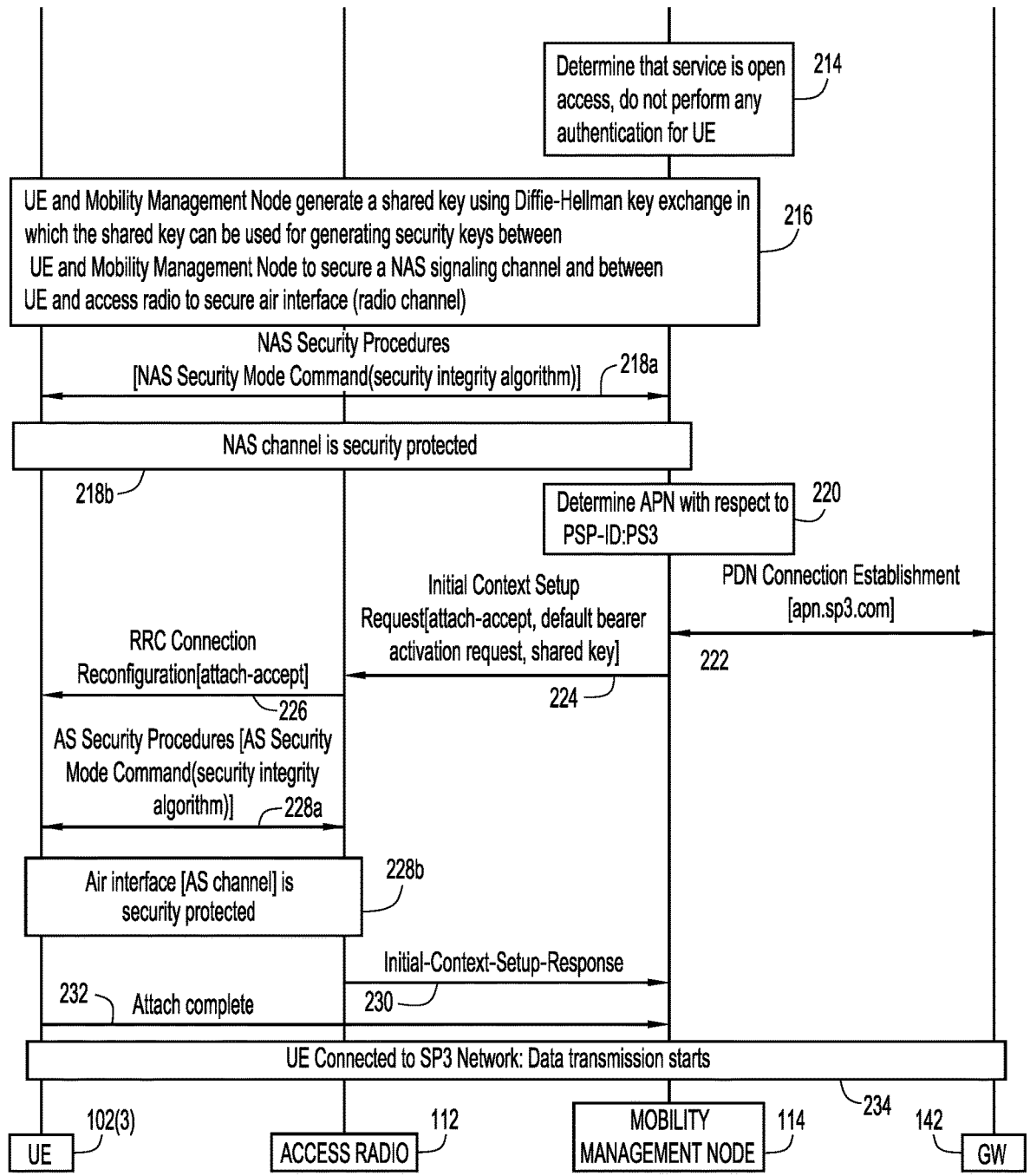

Consider an operational example, as shown in FIGS. 2A and 2B, which are a message sequence diagram illustrating a call flow 200 for providing open access in the neutral host environment of FIG. 1, according to an example embodiment. FIGS. 2A and 2B include UE 102(3), access radio 112, mobility management node 114 and gateway (GW) 142.

At 202, consider that UE 102(3) is configured with a wild card access profile that allows the UE to latch to any open access network matching the parameters in the wild card access profile. In some instances, the profile may be considered a CBRS profile. The wild card access profile includes the SHNI set to the shared PLMN-ID (SHNI: 315-010) as recommended by CBRS Alliance, the CBRS-NID: * (ANY), and a Service-Attribute for PSP selection set to OPEN-ACCESS (Service-Attribute: OPEN-ACCESS). CBRS constructs as utilized in a 3GPP context may be represented as CSG information; for example, a CBRS-NID may be included in a CSG list or identity (csg-identity), as illustrated in further detail herein.

The wild card access profile may also include a security policy for link-layer security. In some embodiments, the wild card access profile may optionally include a list of allowed PSPs, such as stores, venues, facilities, and/or the like (e.g., cafes, restaurants, stadiums, airports, etc.) offering open access to which a UE may prefer to connect. The wild card access profile may not include any Mobile Subscriber Identification Number (MSIN). The MSIN consists of an International Mobile Subscription Identity (IMSI) Block Number (IBN) and User Identity Number (UIN) in which the IBN identifies a CBRS network operator and the UIN is a unique identifier within the IBN space.

At 204, the access radio 112 is configured in NHN 110 as a Hybrid CSG (e.g., CsgInd:false) cell and enabled for open-access-connectivity. The access radio 112 may further be configured with the SHNI: 315-010 and CBRS-NID: ABC-XYZ. The access radio 112 may further be configured with a list of PSP-IDs via a PSP-ID list that may provide a PSP identifier for each PSP and a Service Attribute associated with each PSP. An example PSP-ID list is shown below in Table 1.

TABLE 1

| PSP Identifier | Service Attribute |
| --- | --- |
| SP1 | Subscription (SUB) |
| SP2 | Subscription (SUB) |
| SP3 | Open Access (OPEN) |

The configuration information for access radio 112 may be broadcast in a Master Information Block (MIB) and a number of System Information Blocks (SIBs), as discussed in further detail herein, below. In one example, the PSP-ID list configuration for each PSP and corresponding service attribute may be formatted as PSP Identifier (Service Attribute). Thus, the PSPs and corresponding service attributes for the present example may be represented as: SP1(SUB), SP2(SUB), and SP3(OPEN), as illustrated in PSP-ID list 116.

At 204a, the access radio 112 connects to mobility management node 114 using the S1 Setup Procedure and may indicate to the mobility management node 114 about supported SHNI, CSG-Identity Lists (which, in the context of CBRS access is the CBRS-NID). The S1 Setup Procedure may be performed as prescribed by 3GPP Technical Specification (TS) 36.413. In some embodiments, access radios in a NHN may be manually configured with information described herein; however, in other embodiments, access radios in a NHN may be configured via the S Application Protocol (S1AP) by a mobility management node as prescribed by 3GPP TS 36.413 such that the access radios and the mobility management node may be configured with the same network information.

The access radio 112 broadcasts the MIB, SIB number 1 (SIB1), SIB number 17 (SIB17) and all other SIBs based on its configuration as shown at 206a and 206b. At 206a, access radio 112 performs a SIB1 broadcast that includes the SHNI: 315-010 in a PLMN-ID list (PLMN: 315-010), and the CBRS-NID: ABC-XYZ in a csg-identity indication (csgid: ABC-XYZ), and the csg-indicator=false (csg-ind: false) thereby broadcasting as a hybrid cell via the Broadcast Control Chanel Broadcast Channel (BCCH-BCH). At 206b, the PSP-IDs for SP1, SP2, and SP3 as configured for the PSP-ID list 116 are announced/advertised using the WLAN-Id-List-r12 corresponding to CBRS-Identity (CBRS-I) in SIB17 (e.g., as prescribed by CBRS Alliance Technical Specification 1002) via a BCCH-BCH broadcast. The service attribute for each PSP (OPEN or SUB) as configured for PSP-ID list 116 will also be included in the SIB17 broadcast as metadata or the like in accordance with embodiments of the techniques provided herein. Although the service attribute of OPEN or SUB is discussed herein, this is not meant to limit the broad scope of the present disclosure. In various embodiments, a data set of one or more attributes may be included as metadata in the SIB17 broadcast (and/or any other broadcast) for each of one or more PSPs identified in a broadcast.

At 208a, UE 102(3) scans the SIB1 and performs cell selection by comparing and matching the wild card configured SHNI (315-010) to the PLMN-ID: 315-010 contained in the SIB1 and any CSG-ID contained in the SIB1 (e.g., the wild card CSGAllowedList is set to '*' (ANY)).

UE 102(3) is also also be presented with PSP-ID list along with service attribute (open-access, subscription) obtained from SIB17 and, at 208b, UE 102(3) selects a preferred PSP to which it desires a network connection. Various criteria and/or combinations thereof can be used by a UE for selecting a preferred PSP including, but not limited to: selecting any PSP that is offering open access; selecting a preferred PSP based on the advertised PSP-ID list and an optional allowed PSP list configured in a wild card access profile; selecting a preferred PSP based on a manual selection (e.g., user input) selected from the advertised PSP-ID list and service attributes presented to the UE; and/or the like.

For the present operational example, consider that UE 102(3) selects SP3 as the preferred service provider to which the UE desires connection at 208a by comparing and matching the service attribute indicating open access (OPEN-ACCESS) contained in the wild card access profile configured for the UE with the service attribute indicating open access (OPEN) for SP3.

At 210a, 210b, 210c, and 210d, UE 102(3) and access 112 radio perform a random access procedure and Radio Resource Control (RRC) procedures, as prescribed at least by 3GPP TS 36.300. For example, UE 102(3) and access radio 112 perform the random access procedure at 210a to synchronize the UE and assign resources. At 210b, UE 102(3) requests the access radio 112 to establish an RRC connection via an RRC Connection Request message. At 210c, the access radio 112 sets up a Signaling Radio Bearer (SRB1) and passes UE specific configuration information to UE 102(3) via a RRC Connection Setup message. At 210d, UE 102(3) sends (via a RRC Connection Complete message) an Attach Request (a) and a PDN connectivity request (pdn-connectivity-request) that indicates the preferred PSP-ID (SP3) to which the UE desires connection (psp:SP3).

At 212, the access radio 112 forwards the attach-request and the pdn-connectivity-request to the mobility management node 114 via an Initial UE message (Initial-UE-Message). The access radio 112 also includes its cell csg-identity=ABC-XYZ in the Initial UE Message along with the attach-request and the pdn-connectivity-request.

At 214, mobility management node 114 determines based on the received message that the service for PSP-ID SP3 is open access. In one embodiment, the determination by mobility management node 114 may be based on the service attribute associated with SP3 indicating that SP3 network 140 supports the open access mode. In another embodiment, if all the networks supported by an access radio support the open access mode, the mobility management node can determine, based on the csg-identity of the access radio that an initial context setup request is for an open access mode network connection.

Based on the determination at 214 that the service offered by the PSP-ID (SP3) is open access, the mobility management node 114 does not perform any authentication for UE 102(3). In some embodiments, if an International Mobile Equipment Identifier (IMEI) is presented for a UE, the mobility management node may perform an equipment identity check for stolen devices. Thus, there is no explicit authentication of the UE as the identity of the UE is unknown to the network and the UE will have no authenticated identity in the network.

At 216, the UE 102(3) and the mobility management node 114 will execute or run a Key exchange protocol to secure the generation of a shared key (e.g., Key Access Security Management Entries ($K_{ASME}$)) for the link-layer. In at least one embodiment, the Opportunistic Wireless Encryption (OWE) approach per Request For Comments (RFC) 8110 utilizing a Diffie-Hellman key exchange can be used to generate the shared key. This shared key can be used between the UE 102(3) and the mobility management node 114 for securing a NAS signaling channel (generally, NAS communication channel), as discussed at 218a and 218b, below, and can be used between the UE 102(3) and access radio 112 for securing the air interface (generally, radio channel communications), as discussed at 228a and 228b, below. Security procedures discussed herein provide for securing the path between the un-authenticated UE and the network using, for example, the OWE mechanism. In at least one implementation, this is intended to disallow any sniffing attacks on the link by forcing the UE and the network to have generated security keys for securing the link.

At 218a, the mobility management node 114 and the UE 102(3) will perform NAS Security Procedures, as prescribed at least by 3GPP TS 24.301 to exchange a Security Mode Command in order to make the NAS signaling channel secure between the UE 102(3) and the mobility management node 114, as shown at 218b.

Following securing of the NAS channel, the mobility management node determines the Access Point Name (APN) at 220 based on the PSP-ID (SP3) in order to start PDN connectivity procedures with GW 142 and setup a default bearer for the UE 102(3) session at 222. At 224, the mobility management node sends, via an Initial Context Setup Request message, an Attach Accept (attach-accept), a default bearer activation request, a CSG membership status indicator (CsgMembershipStatus=member), and the shared key to access radio 112. The shared access key can be used for securing the air interface radio channel.

At 226, the access radio 112 forwards the attach-accept to UE 102(3) via an RRC Connection Reconfiguration Message. At 228a, the access radio 112 will exchange an Access Stratum (AS) Security Mode Command with UE 102(3) to make the air interface (AS channel) secured between the UE 102(3) and the access radio 112, as shown at 228b. At 230, the access radio 112 sends an Initial Context Setup Response message to the mobility management node 114 and at 232, UE 102(2) sends an attach complete message to the mobility management node 114 via the access radio 112. Following the operations discussed above, UE 102(3) is connected to the open access SP3 network 140 and data transmissions can begin between the UE and the SP3 network 140, as shown at 234. Accordingly, call flow 200 illustrates techniques for providing open access to private radio services in the neutral host environment of FIG. 1.

It should be noted that although, the focus of the example call flow 200 illustrated in FIG. 2 on CBRS-based NHN deployments, the techniques described herein may equally work for NHN deployments based on other frequency bands/spectrums (e.g., non-CBRS, etc.) as well as non-NHN CBRS/non-CBRS deployments. For example, the service attribute can still be included in SIB17 along with a single PSP Id and service attribute, or the service attribute alone can be included either in SIB1 or SIB17. The wild card access profile configured in a UE will be able to match the service and latch on to it.

Figure 3:
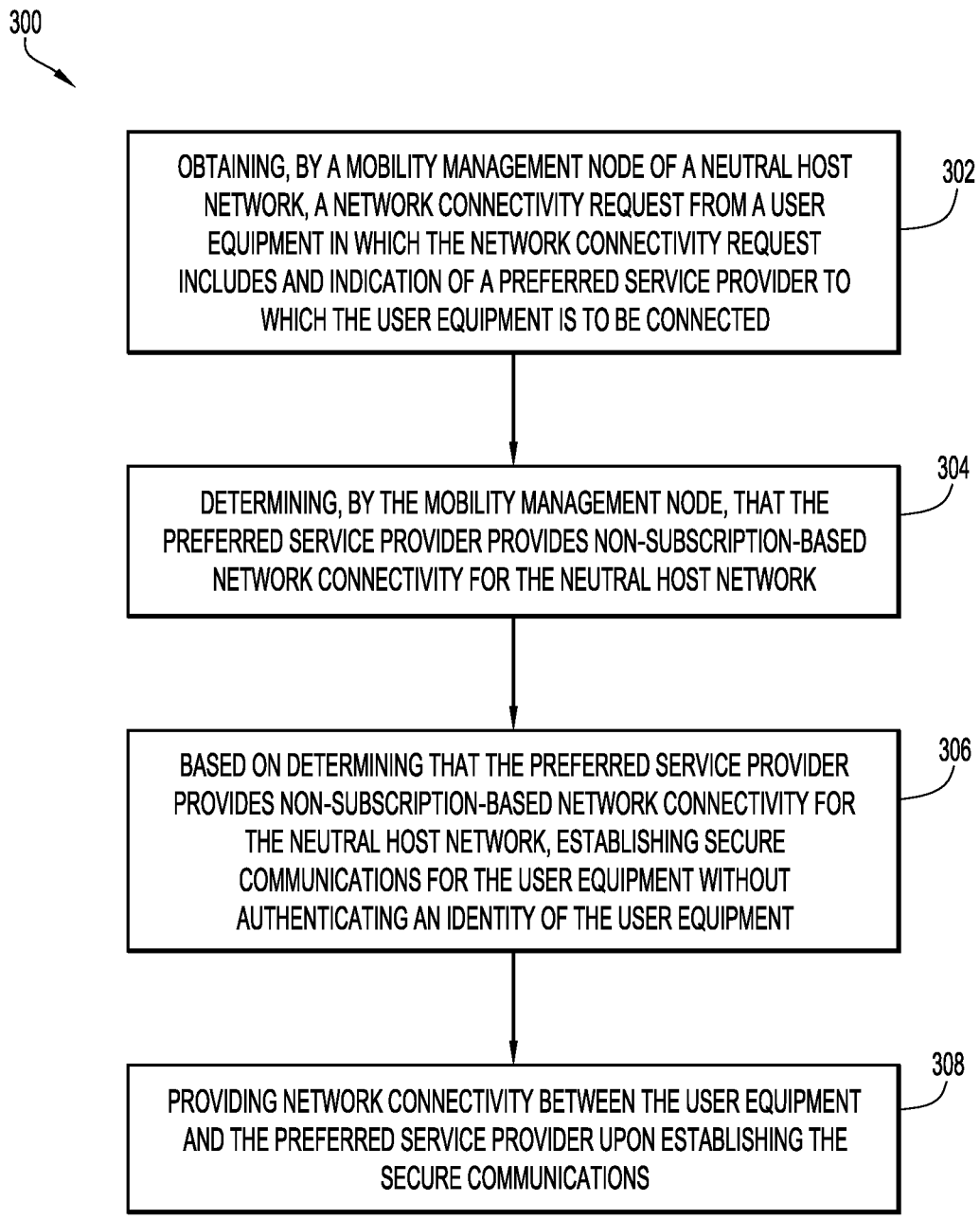
FIG. 3 is a flow chart depicting a method according to an example embodiment.

Referring to FIG. 3, FIG. 3 is a flow chart depicting a method 300 according to an example embodiment. In at least one embodiment, method 300 may be associated with operations that can be performed by a mobility management node (e.g., mobility management node 114) and an access radio (e.g., access radio 112) for providing open access in a neutral host environment.

At 302, the method may include obtaining, by the mobility management node of the neutral host network, a network connectivity request from a user equipment (e.g., UE 102(3)) in which the network connectivity request includes an indication of a preferred service provider to which the user equipment is to be connected.

At 304, the method includes the mobility management node determining that the preferred service provider provides non-subscription-based network connectivity for the neutral host network. In one embodiment, the determination at 304 may be based on a service attribute associated with the service provider that indicates that the network of the preferred service provider supports an open access (e.g., non-subscription-based) mode. In one embodiment, the determination at 304 may be based on a determination by the mobility management node that the access radio from which the user equipment request was received supports only open access mode networks (e.g., utilizing the CSG identity (CBRS-NID) configured for the access radio.

At 306, based on determining that the preferred service provider provides non-subscription-based network connectivity for the neutral host network, the method includes establishing secure communications for the user equipment in which the secure communications are established for the user equipment without the mobility management node authenticating an identity of user equipment. In at least one embodiment, the operations at 306 may include securing a NAS signaling channel between the user equipment and the mobility management node and also securing an AS air interface channel between the user equipment and the access radio using a shared key generated via the UE and the mobility management node using a Diffie-Hellman key exchange.

At 308, the method includes providing network connectivity between the user equipment and the preferred service provider upon establishing the secure communications.

Figure 4:
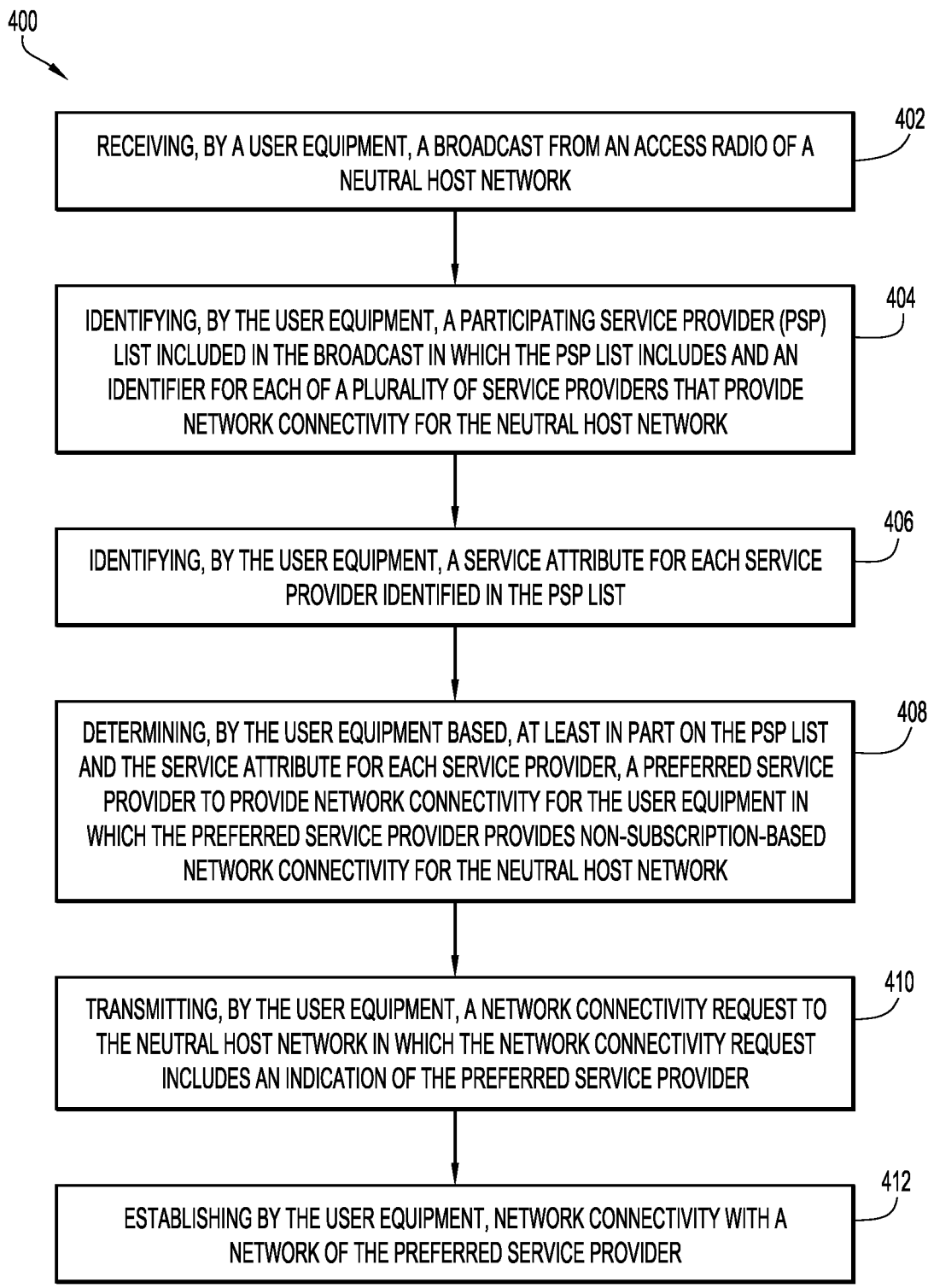
FIG. 4 is another flow chart depicting another method according to an example embodiment.

Referring to FIG. 4, FIG. 4 is another flow chart depicting another method 400 according to an example embodiment. In at least one embodiment, method 400 may be associated with operations that may be performed by a user equipment (e.g., UE 102(3)) for connecting to an open access (e.g., non-subscription-based) network in a neutral host environment.

At 402, the method may include receiving, by the user equipment, a broadcast from an access radio of a neutral host network. The broadcast may include an MIB, SIB1, and SIB17, among other SIBs. At 404, method includes the user equipment identifying a participating service provider (PSP) list included in the broadcast (e.g., by scanning SIB 17) in which the PSP list includes an identifier for each of a plurality of service providers that provide network connectivity for the neutral host network. At 406, the method includes the user equipment identifying a service attribute (e.g., SUB/OPEN, included as metadata in SIB17) for each service provider identified in the PSP list.

At 408, the method may include the user equipment determining, based, at least in part, on the PSP list and the service attribute for each service provider, a preferred service provider to provide network connectivity for the user equipment in which the preferred service provider provides non-subscription-based network connectivity for the neutral host network. The determining at 408 may include comparing/matching service attribute information and, optionally, a PSP list configured for a wild card profile of the user equipment against the PSP list and service attribute for each service provider obtained from the broadcast.

At 410, the method may include the user equipment transmitting a network connectivity request to the neutral host network (e.g., to a mobility management node via an access radio) in which the network connectivity request includes, at least in part, an indication of the preferred service provider. At 412, the method includes the user equipment establishing network connectivity with a network of the preferred service provider. For example, network connectivity for the user equipment may be established using techniques as discussed herein with reference to FIGS. 1, 2A, and 2B.

In summary, techniques presented herein provide the ability for a device to select an open access (e.g., non-subscription-based) network in the presence of multiple service networks provided by different service providers within a neutral host network based on an explicit handshake between a user equipment and the network. For examples, techniques presented herein may include a method to provide open-access connectivity in a shared access and in a neutral host environment. Techniques presented herein may also provide for the ability of a mobility management node to configure policies on access radio(s) for open access or subscription-based access specific to PSP-IDs. Techniques presented herein may also include configuring a wild card profile on a UE, which allows the device to look for OPEN-ACCESS networks. In some embodiments, there can also be an optional preferred PSP list configured on a UE. Techniques presented herein additionally provide for the inclusion of service attribute information (e.g., open-access, subscription) as metadata in SIB17 that can be broadcast along with a PSP-ID list by an access radio in a NHN. Based on the wild card access profile configured for the UE and, optionally, preferred PSP(s) configured for the UE, the UE can perform auto selection of a preferred service provider from the broadcast PSP-ID list. In some embodiments, techniques presented herein provide for manual selection of a preferred service provider from the broadcast PSP-ID list in the absence of a preferred PSP in the UE profile. In still some embodiments, the UE may randomly choose a PSP (e.g., in the absence of a preferred PSP). In at least one implementation, techniques presented herein may be utilized to provide open access support to CBRS accesses.

Figure 5:
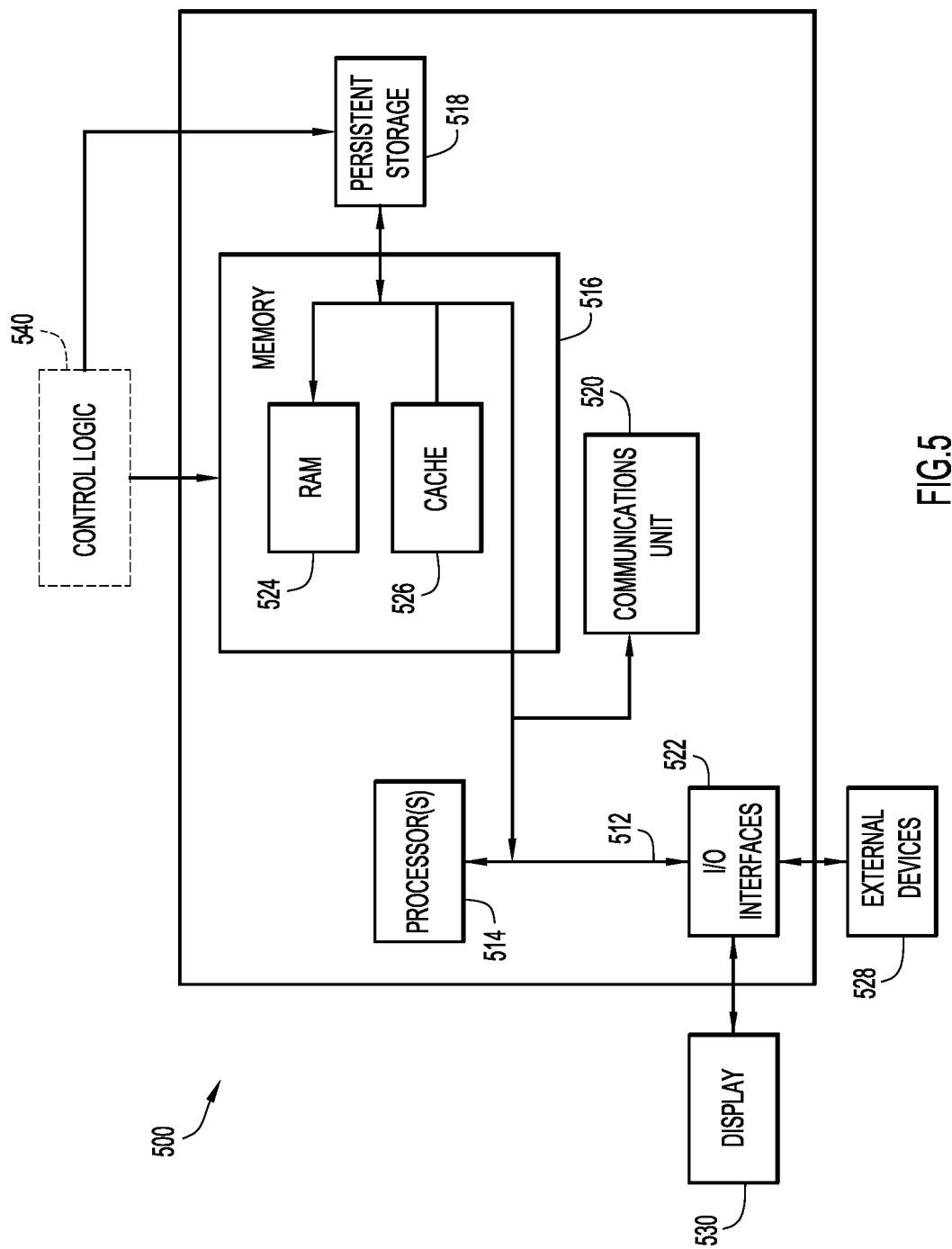
FIG. 5 is a hardware block diagram of a computing device that may perform functions to participate in techniques for providing open access in a neutral host environment, in connection with the techniques depicted in FIGS. 1-4, according to an example embodiment.

Referring to FIG. 5, FIG. 5 illustrates a hardware block diagram of a mobility management node 500 (e.g., mobility management node 114) that may perform functions to participate in techniques for providing open access in a neutral host environment, referred to herein in connection with FIGS. 1-4, according to an example embodiment. It should be appreciated that FIG. 5 provides only an illustration of one embodiment and does not imply any limitations with regard to the environments in which different embodiments may be implemented. Many modifications to the depicted environment may be made.

As depicted, the mobility management node 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which can be inclusive on non-transitory computer readable storage media. In the depicted embodiment, memory 516, which may be inclusive of one or more memory element(s), may include random access memory (RAM) 524 and cache memory 526. In general, memory 516 can include any suitable volatile or non-volatile computer readable storage media. Instructions for control logic 540 may be stored in memory 516 and/or persistent storage 518 for execution by processor(s) 514. When the processor(s) 514 execute control logic 540, the processor(s) 514 are caused to perform the operations described above in connection with FIGS. 1-4.

One or more programs and/or other logic may be stored in persistent storage 518 for execution by one or more of the respective computer processors 514 via one or more memory element(s) of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to mobility management node 500 (e.g., access radio 112). For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

In various embodiments, a mobility management node (e.g., mobility management node 500 and 114) may be implemented as any combination of a 3GPP Mobility Management Entity for a Fourth Generation (4G) network, a 3GPP Access and Mobility Management Function (AMF) for a 5th Generation (5G) network, and/or any other mobility management node now known here and/or hereinafter developed.

Figure 6:
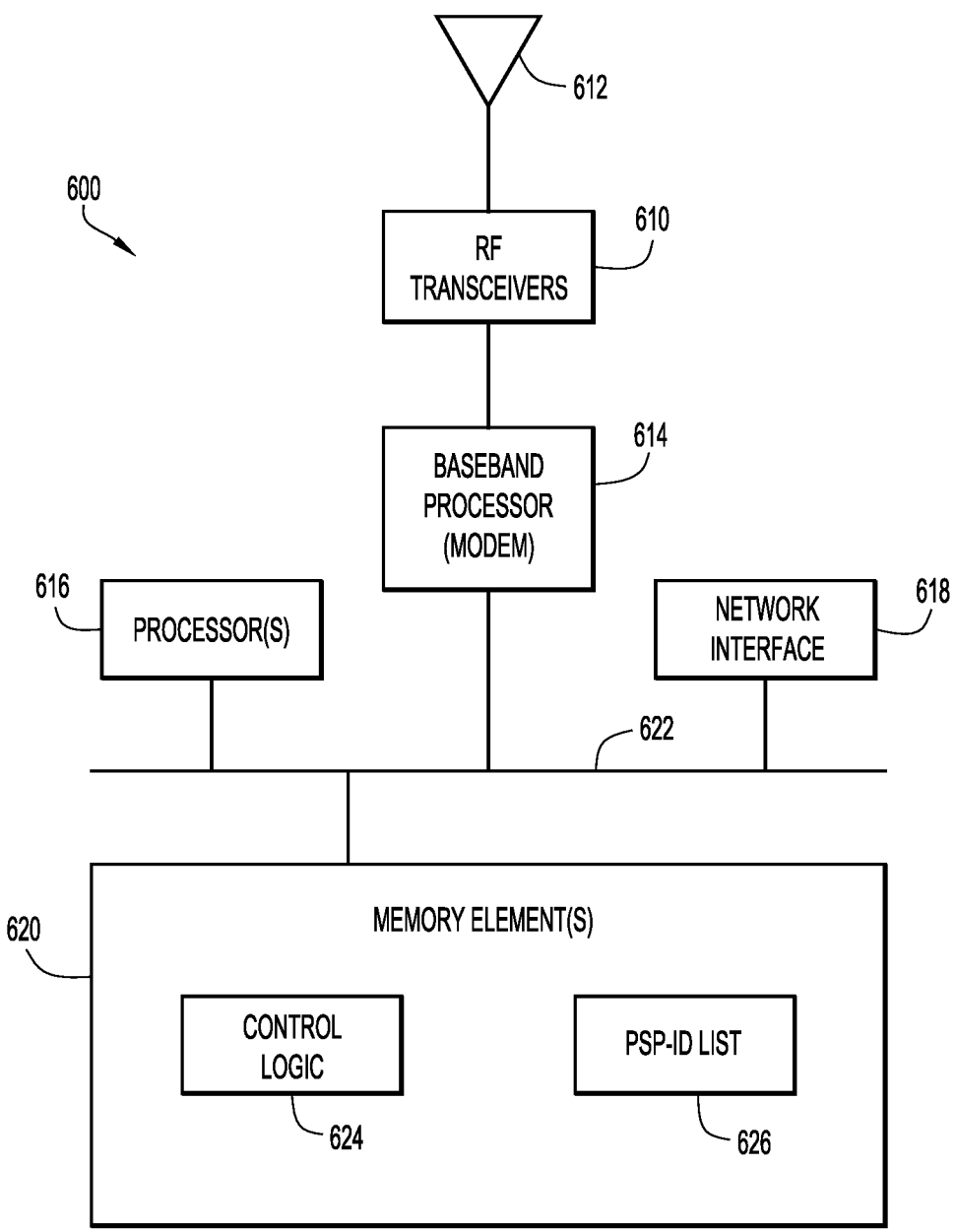
FIG. 6 is a hardware block diagram of an access radio device that may perform functions to participate in providing open access in a neutral host environment, in connection with the techniques depicted in FIGS. 1-4, according to an example embodiment.

Referring to FIG. 6, FIG. 6 illustrates a hardware block diagram an access radio 600 that may perform functions to participate in providing open access in a neutral host environment, referred to herein in connection with FIGS. 1-4, according to an example embodiment. In at least one embodiment, access radio 600 may be representative of a configuration of access radio 112 discussed herein. It should be appreciated that FIG. 6 provides only an illustration of one embodiment and does not imply any limitations with regard to the environments in which different embodiments may be implemented. Many modifications to the depicted environment may be made.

In at least one embodiment, access radio 600 includes one or more radio RF transceiver(s) 610, one or more antennas or antenna arrays 612, a baseband processor or modem 614, one or more processor(s) 616, a network interface 618, one or more memory element(s) 620 and a bus 622. The RF transceiver(s) 610 perform the RF transmission and RF reception of wireless signals, and the baseband processor (modem) 614 performs baseband modulation and demodulation, etc. The network interface 618 enables wired network communications (e.g., with mobility management node 114). The memory element(s) 620 may take any of the forms of the memory referred to above in connection with FIG. 5. The processor(s) 616 execute instructions stored in memory 620 to control the access radio 600 to execute operations as discussed herein. The memory element(s) 620 store access radio control logic 624 and a PSP-ID list 626 (e.g. PSP-ID list 116). PSP identifiers and service attributes for each PSP of a neutral host network may be stored in PSP-ID list 626. During operation, when the processor(s) 616 execute control logic 624, the processor(s) 616 are caused to perform the operations described above in connection with FIGS. 1-4, such as, for example, broadcasting the MIB, SIB1, and SIB17 (among others) in which SIB17 announces the PSP-IDs along with metadata that provides a service attribute identifying each PSP as being subscription-based (SUB) or non-subscription-based (OPEN), among other operations as discussed herein.

In various embodiments, an access radio (e.g., access radio 600 and access radio 112) may be implemented as any combination of a 3GPP 4G/LTE evolved Node B (eNodeB or eNB), a 3GPP 5G next generation NB (gNB), a CBRS device (CBSD), wireless local area network (WLAN) (e.g., Wi-Fi) radio, and/or any other access radio now known here and/or hereinafter developed.

Figure 7:
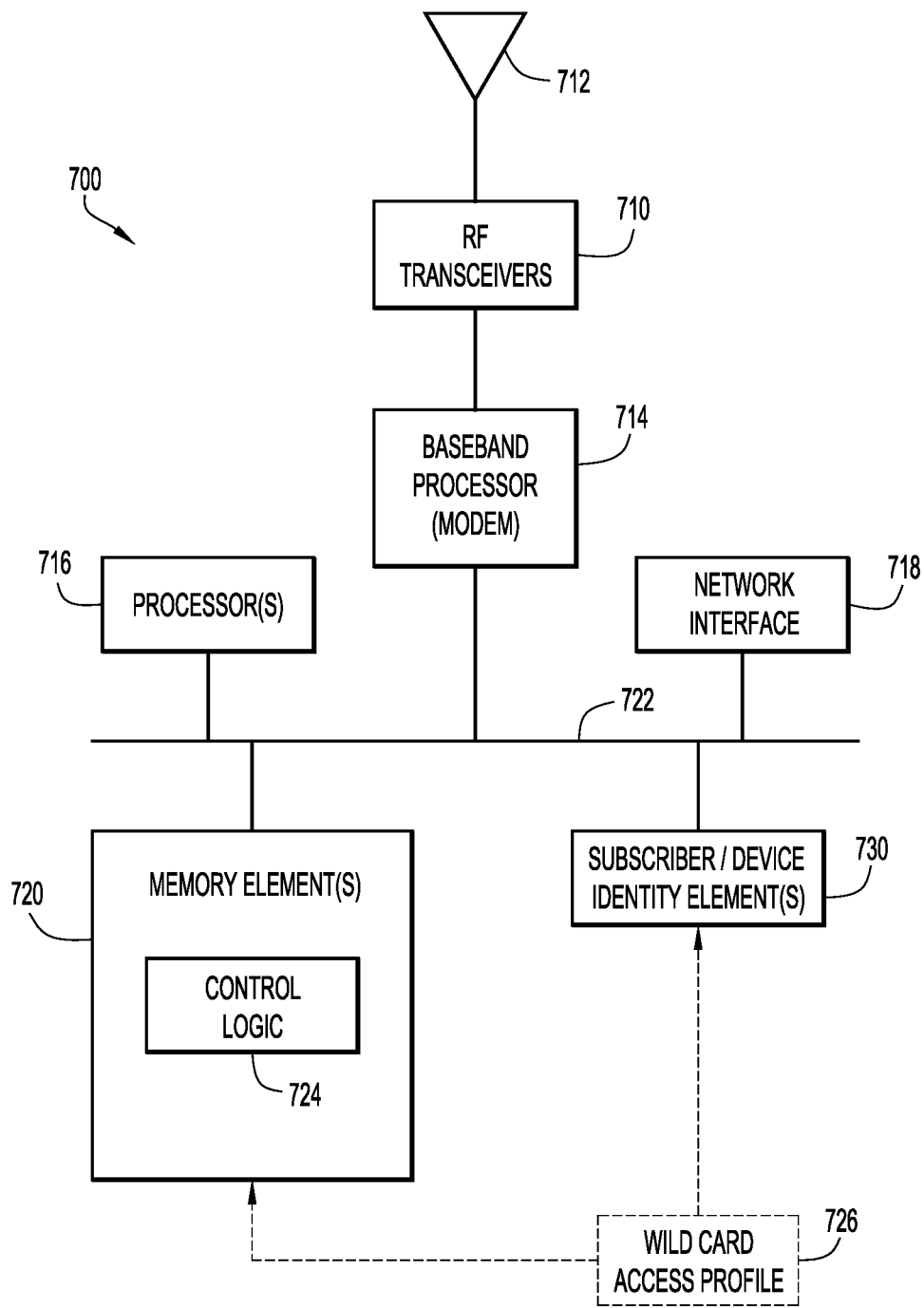
FIG. 7 is a hardware block diagram of a user equipment device that may perform functions for connecting to an open access network in a neutral host environment, in connection with the techniques depicted in FIGS. 1-4, according to an example embodiment.

Referring to FIG. 7, FIG. 7 illustrates a hardware block diagram of a user equipment 700 that may perform functions for connecting to an open access network in a neutral host environment, in connection with the techniques depicted in FIGS. 1-4, according to an example embodiment. In at least one embodiment, user equipment may be representative of a configuration of UE 102(3) discussed herein. It should be appreciated that FIG. 7 provides only an illustration of one embodiment and does not imply any limitations with regard to the environments in which different embodiments may be implemented. Many modifications to the depicted environment may be made.

In at least one embodiment, user equipment 700 includes one or more radio RF transceiver(s) 710, one or more antennas or antenna arrays 712, a baseband processor or modem 714, one or more processor(s) 716, a network interface 718, one or more memory element(s) 720, one or more subscriber/device identity element(s) 730, and a bus 722. The RF transceiver(s) 710 perform the RF transmission and RF reception of wireless signals, and the baseband processor (modem) 714 performs baseband modulation and demodulation, etc. The network interface 718 enables wired network communications (e.g., with a computing device, etc.). The memory element(s) 720 may take any of the forms of the memory referred to above in connection with FIG. 5. In various embodiments, subscriber/device identity element(s) 730 may be a SIM, an embedded SIM (eSIM), UICC, eUICC, or the like. The memory element(s) 720 store user equipment control logic 724. A wild card access profile 726 may be stored in any combination of memory element(s) 720 and/or subscriber/device identity element(s) 730 and may be configured to enable the user equipment 700 to connect to an open access network, as discussed in connection with techniques described herein.

The processor(s) 716 execute instructions via control logic 724 stored in memory 720 to control the user equipment 700 to execute operations as discussed herein. During operation, when the processor(s) 716 execute control logic 724, the processor(s) 716 are caused to perform the operations described above in connection with FIGS. 1-4, such as, for example, scanning SIB1 to perform cell selection, selecting a PSP by comparing/matching service attribute information contained in the wild card access profile 726 to PSP information obtained from SIB17, among other operations as discussed herein.

In various embodiments, a user equipment (e.g., user equipment 700 and UE 102(1)-102(3)) may be associated with any electronic device, machine, robot, etc. wishing to initiate a flow in a system. The terms 'user equipment', 'device', 'electronic device', 'mobile device', 'computing device', 'machine', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an IP phone, any other device and/or combination of devices, component, element, and/or object capable of initiating voice, audio, video, media, or data exchanges within a system. User equipment discussed herein may also be inclusive of a suitable interface to a human user such as a microphone, a display, a keyboard, or other terminal equipment. User equipment discussed herein may also be any device that seeks to initiate a communication on behalf of another entity or element such as a program, a database, or any other component, device, element, or object capable of initiating an exchange within a system.

In at least one form, a computer-implemented method is provided that may include obtaining, by a mobility management node of a neutral host network, a network connectivity request from a user equipment, wherein the network connectivity request comprises an indication of a preferred service provider to which the user equipment is to be connected; determining, by the mobility management node, that the preferred service provider provides non-subscription-based network connectivity for the neutral host network; based on determining that the preferred service provider provides non-subscription-based network connectivity for the neutral host network, establishing secure communications for the user equipment, wherein the secure communications are established for the user equipment without authenticating an identity of user equipment; and providing network connectivity between the user equipment and the preferred service provider upon establishing the secure communications. The secure communications include Non-Access Stratum (NAS) communications and air interface communications.

The method may further include provisioning a participating service provider (PSP) list comprising a plurality of service providers that provide services within the neutral host network, wherein at least service provider of the PSP list provides non-subscription-based services within the neutral host network. Each service provider included in the PSP list may associated with a service attribute that identifies whether each service provider provides subscription-based services or non-subscription-based services within the neutral host network. In some implementations, the provisioning may include provisioning the PSP list at the mobility management node and at least one access radio for the neutral host network. In still some implementations, the provisioning may include provisioning the PSP list for the at least one access radio for the neutral host network by the mobility management node.

In various implementations, the at least one access radio may be at least one of: a 4th Generation (4G) evolved node B; a 5th Generation (5G) next generation node B; and a Citizen Broadband Radio Service (CBRS) device. In at least one implementation, broadcasting the PSP list and the service attribute for each service provider by at least one radio for the neutral host network. The broadcasting may include broadcasting a System Information Block (SIB) number 17. In various implementations, the mobility management node may be at least one of: a 4th Generation (4G) Mobility Management Entity (MME); and a 5th Generation (5G) Access and Mobility Management Function (AMF).

In at least one other form, another computer-implemented method is provided and may include receiving, by a user equipment, a broadcast from an access radio of a neutral host network; identifying a participating service provider (PSP) list included in the broadcast, wherein the PSP list includes an identifier for each of a plurality of service providers that provide network connectivity for the neutral host network; identifying a service attribute included in the broadcast for each service provider identified in the PSP list; determining, based, at least in part, on the PSP list and the service attribute for each service provider, a preferred service provider to provide network connectivity for the user equipment in which the preferred service provider provides non-subscription-based network connectivity for the neutral host network; and transmitting a network connectivity request to the neutral host network, wherein the network connectivity request comprises an indication of the preferred service provider.

The user equipment is provisioned with an access profile that includes an indication that the user equipment can attach to any shared home network and that includes a service attribute indicating a preference of the user equipment for selecting a non-subscription-based network service provider for network connectivity. The access profile may include one or more service provider identifiers for each of one or non-subscription-based network service providers to which the user equipment can select for network connectivity. The service attribute for each of the plurality of service providers may indicate one of subscription-based network connectivity or non-subscription-based network connectivity provided by each service provider.

In at least one implementation, the determining includes comparing the service attribute included in the access profile configured for the user equipment to the service attribute for each service provider identified in the PSP list to identify the preferred service provider. The preferred service provider can be identified based, at least in part, on the service attribute included in the access profile for the user equipment matching a service attribute of the preferred service provider. The identifying may include identifying the preferred service provider based further on a service provider identifier included in the access profile for the user equipment. The broadcast may include a System Information Block (SIB) number 17. The method may further include establishing a connection with a network of the preferred service provider.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. In general, packet is a formatted unit of data that can contain control or routing information (e.g., source and destination address, source and destination port, etc.) and a payload (e.g., data, signaling, instructions, and/or the like), which is also sometimes referred to as a data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless)

that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), wireless LAN (WLAN), Wide Area Network (WAN), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number/combination of any type of network (e.g., LAN, WLAN, WAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, WLAN, Ethernet network, hardwire, wireless link, Intranet, etc.).

A system or computing device may employ any number of any conventional or other databases, data stores or storage structures (e.g., files, databases, data structures, data or other repositories, etc.) to store information (e.g., data relating to PSPs, service attributes, etc.). The database system may be implemented by any number of any conventional or other databases, data stores or storage structures (e.g., files, databases, data structures, data or other repositories, etc.) to store information (e.g., data relating to PSPs, service attributes, etc.). A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ and/or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN, WLAN, WAN, etc., or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, by a mobility management node of a neutral host network, a network connectivity request from a user equipment, wherein the network connectivity request comprises an indication of a preferred service provider to which the user equipment is to be connected;
   determining, by the mobility management node, that the preferred service provider provides non-subscription-based network connectivity for the neutral host network;
   based on determining that the preferred service provider provides non-subscription-based network connectivity for the neutral host network, establishing secure communications for the user equipment, wherein the secure communications are established for the user equipment without authenticating an identity of user equipment; and
   providing network connectivity between the user equipment and the preferred service provider upon establishing the secure communications.

2. The method of claim 1, wherein the secure communications include Non-Access Stratum (NAS) communications and air interface communications.

3. The method of claim 1, further comprising:
   provisioning a participating service provider (PSP) list comprising a plurality of service providers that provide services within the neutral host network, wherein at least one service provider of the PSP list provides non-subscription-based services within the neutral host network.

4. The method of claim 3, wherein each service provider included in the PSP list is associated with a service attribute that identifies whether each service provider provides subscription-based services or non-subscription-based services within the neutral host network.

5. The method of claim 3, wherein the provisioning includes provisioning the PSP list at the mobility management node and at least one access radio for the neutral host network.

6. The method of claim 5, wherein the provisioning includes provisioning the PSP list for the at least one access radio for the neutral host network by the mobility management node.

7. The method of claim 5, wherein the at least one access radio is at least one of:
   a 4th Generation (4G) evolved node B;
   a 5th Generation (5G) next generation node B; and
   a Citizen Broadband Radio Service (CBRS) device.

8. The method of claim 4, further comprising:
   broadcasting the PSP list and the service attribute for each service provider by at least one radio for the neutral host network.

9. The method of claim 8, wherein the broadcasting includes broadcasting a System Information Block (SIB) number 17.

10. The method of claim 1, wherein the mobility management node is at least one of:
- a 4th Generation (4G) Mobility Management Entity (MME); and
- a 5th Generation (5G) Access and Mobility Management Function (AMF).

11. One or more non-transitory computer readable storage media encoded with instructions that, when executed by a processor, cause the processor to perform operations, comprising:
- obtaining, by a mobility management node of a neutral host network, a network connectivity request from a user equipment, wherein the network connectivity request comprises an indication of a preferred service provider to which the user equipment is to be connected;
- determining, by the mobility management node, that the preferred service provider provides non-subscription-based network connectivity for the neutral host network;
- based on determining that the preferred service provider provides non-subscription-based network connectivity for the neutral host network, establishing secure communications for the user equipment, wherein the secure communications are established for the user equipment without authenticating an identity of user equipment; and
- providing network connectivity between the user equipment and the preferred service provider upon establishing the secure communications.

12. The media of claim 11, further comprising instructions that, when executed by the processor, cause the processor to perform further operations, comprising:
- provisioning a participating service provider (PSP) list comprising a plurality of service providers that provide services within the neutral host network, wherein at least service provider of the PSP list provides non-subscription-based services within the neutral host network.

13. The media of claim 12, wherein each service provider included in the PSP list is associated with a service attribute that identifies whether each service provider provides subscription-based services or non-subscription-based services within the neutral host network.

14. The media of claim 12, wherein the provisioning includes provisioning the PSP list at the mobility management node and at least one access radio for the neutral host network.

15. The media of claim 13, further comprising:
- broadcasting the PSP list and the service attribute for each service provider by at least one radio for the neutral host network in a System Information Block number 17.

16. A system comprising:
- at least one memory element for storing data; and
- at least one processor for executing instructions associated with the data, wherein executing the instructions causes the system to perform operations, comprising:
  - obtaining, by a mobility management node of a neutral host network, a network connectivity request from a user equipment, wherein the network connectivity request comprises an indication of a preferred service provider to which the user equipment is to be connected;
  - determining, by the mobility management node, that the preferred service provider provides non-subscription-based network connectivity for the neutral host network;
  - based on determining that the preferred service provider provides non-subscription-based network connectivity for the neutral host network, establishing secure communications for the user equipment, wherein the secure communications are established for the user equipment without authenticating an identity of user equipment; and
  - providing network connectivity between the user equipment and the preferred service provider upon establishing the secure communications.

17. The system of claim 16, wherein the secure communications include Non-Access Stratum (NAS) communications and air interface communications.

18. The system of claim 16, wherein executing the instructions causes the system to perform further operations, comprising:
- provisioning a participating service provider (PSP) list comprising a plurality of service providers that provide services within the neutral host network, wherein at least service provider of the PSP list provides non-subscription-based services within the neutral host network.

19. The system of claim 18, wherein each service provider included in the PSP list is associated with a service attribute that identifies whether each service provider provides subscription-based services or non-subscription-based services within the neutral host network.

20. The system of claim 19, wherein executing the instructions causes the system to perform further operations, comprising:
- broadcasting the PSP list and the service attribute for each service provider by at least one radio for the neutral host network.

* * * * *